(12) United States Patent
Dotz

(10) Patent No.: US 12,231,008 B2
(45) Date of Patent: Feb. 18, 2025

(54) STATOR WITH PINS AND A PARALLEL CONNECTION FOR AN ELECTRIC MACHINE

(71) Applicant: Valeo Siemens eAutomotive Germany GmbH, Erlangen (DE)

(72) Inventor: Boris Dotz, Munich (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 174 days.

(21) Appl. No.: 17/642,111

(22) PCT Filed: Sep. 8, 2020

(86) PCT No.: PCT/EP2020/075011
§ 371 (c)(1),
(2) Date: Mar. 10, 2022

(87) PCT Pub. No.: WO2021/048085
PCT Pub. Date: Mar. 18, 2021

(65) Prior Publication Data
US 2022/0376591 A1 Nov. 24, 2022

(30) Foreign Application Priority Data
Sep. 11, 2019 (DE) .................... 10 2019 124 462.5

(51) Int. Cl.
*H02K 15/085* (2006.01)
*H02K 3/14* (2006.01)
*H02K 3/28* (2006.01)

(52) U.S. Cl.
CPC ............. *H02K 15/085* (2013.01); *H02K 3/14* (2013.01); *H02K 3/28* (2013.01)

(58) Field of Classification Search
CPC .. H02K 3/04; H02K 3/12; H02K 3/14; H02K 3/28; H02K 3/38; H02K 3/48; H02K 3/50;
(Continued)

(56) References Cited
U.S. PATENT DOCUMENTS 7,005,773 B2 2/2006 Nakamura
9,136,738 B2 9/2015 Ikeda et al.
(Continued)

FOREIGN PATENT DOCUMENTS

CN 105191071 A 12/2015
CN 105917555 A 8/2016
(Continued)

OTHER PUBLICATIONS

Office Action issued in counterpart Korean Application No. 10-2022-7011699, dated Sep. 10, 2023 (10 pages).
(Continued)

*Primary Examiner* — Christopher M Koehler
*Assistant Examiner* — Ahmed F Seck
(74) *Attorney, Agent, or Firm* — Osha Bergman Watanabe & Burton LLP

(57) ABSTRACT

A stator for an electric machine has a plurality of pins, which are arranged on concentric circles at different distances from a stator center point in slots and each concentric circle forms a layer, wherein four pins in different layers are respectively connected to one another in series and form a winding, a first pin of the winding is located in a first slot in the 4n−1 layer, wherein n is a natural number, a second pin of the winding is located in a second slot in the 4n layer, wherein the second slot is at a first radial distance from the first slot in a first circumferential direction of the stator, a third pin of the (Continued)

winding is located in the first slot in the 4n−3 layer, a fourth pin of the winding is located in the second slot in the 4n−3 layer.

18 Claims, 14 Drawing Sheets

(58) Field of Classification Search
CPC .. H02K 3/52; H02K 15/0031; H02K 15/0056; H02K 15/0068; H02K 15/0087; H02K 15/0414; H02K 15/0421; H02K 15/0428; H02K 15/0435; H02K 15/062; H02K 15/064; H02K 15/067; H02K 15/085; H02K 19/12; H02K 19/26; H02K 1/16; H02K 1/165
See application file for complete search history.

(56) References Cited

U.S. PATENT DOCUMENTS

| | | | |
|---|---|---|---|
| 2003/0015932 | A1 | 1/2003 | Oohashi et al. |
| 2011/0025162 | A1 | 2/2011 | Naganawa et al. |
| 2015/0076953 | A1* | 3/2015 | Tamura .................... H02K 3/28 310/208 |
| 2015/0207374 | A1* | 7/2015 | Tsuiki ...................... H02K 3/12 |
| 2015/0381000 | A1* | 12/2015 | Tamura .................... H02K 3/28 310/207 |
| 2019/0260275 | A1* | 8/2019 | Iki .......................... B23K 26/242 |

FOREIGN PATENT DOCUMENTS

| | | |
|---|---|---|
| DE | 60029294 T2 | 7/2007 |
| DE | 102010053718 A1 | 6/2012 |
| DE | 102010053719 A1 | 6/2012 |
| DE | 112013006691 T5 | 10/2015 |
| EP | 3096441 A1 | 11/2016 |
| JP | 2010531127 A | 9/2010 |
| JP | 2010252438 A | 11/2010 |
| JP | 201136009 A | 2/2011 |
| JP | 2013081351 A | 5/2013 |
| JP | 201888729 A | 6/2018 |
| WO | 2012/072754 A2 | 6/2012 |
| WO | 2015079732 A1 | 6/2015 |

OTHER PUBLICATIONS

Office Action issued in counterpart Chinese Application No. 202080073080.7, dated Oct. 17, 2023 (8 pages).
International Search Report and Written Opinion issued in corresponding International Patent Application No. PCT/EP2020/075011, mailed on Dec. 11, 2020 (12 pages).
Germany Search Report in corresponding German Application No. 10 2019 124 462.5, dated Jun. 30, 2020 (8 pages).
Office Action issued in counterpart Japanese Application No. 2022-515983, dated Jun. 19, 2023 with English translation (14 pages).

* cited by examiner

STATOR WITH PINS AND A PARALLEL CONNECTION FOR AN ELECTRIC MACHINE

The invention relates to a stator with pins for an electric machine, in particular an electric motor.

PRIOR ART

Electric machines are generally known and are being increasingly used as electric motors for the driving of vehicles. An electric machine consists of a stator and a rotor.

The stator comprises a multiplicity of slots, in which the windings are guided. The windings may be formed from isolated copper rods in the form of what are referred to as pins. The rotor is located in the stator and is connected to a rotor shaft.

Such a pin motor, U-pin motor or hairpin motor is known, for example, from U.S. Pat. No. 9,136,738 B2.

Problem and Solution

The object of the present invention is to provide a stator having windings composed of pins, which is easy to manufacture.

According to the invention, the stator for an electric machine comprises a multiplicity of pins, which are arranged in slots on concentric circles that are at different distances from a stator center point and each concentric circle forms a layer, wherein four pins in different layers are respectively connected to one another in series and form a winding, a first pin of the winding is located in a first slot in the 4n–1 layer, wherein n is a natural number, a second pin of the winding is located in a second slot in the 4n layer, wherein the second slot is at a first radial distance from the first slot in a first circumferential direction of the stator, a third pin of the winding is located in the first slot in the 4n–3 layer, a fourth pin of the winding is located in the second slot in the 4n–3 layer.

A stator having the winding according to the invention can be produced easily and generates an efficient electromagnetic field. The types of connection produce an electrically conductive connection between the pins in the slots. The type of connection may be the welding of conductors onto the pins or the pins may already be in the form of a double pin, what is referred to as a U-pin, and thereby already produce a connection when inserted into the stator. The welding together of end portions of pins that are bent toward one another also constitutes a type of connection.

The layers can be numbered in increasing order from the outside to the inside in relation to the stator center point.

Preferably the stator may comprise a first and a second end face and the first and the second pin can be connected to one another on the second end face by means of a first type of connection, the second and the third pin can be connected to one another on the first end face by means of a second type of connection, the third and the fourth pin can be connected to one another on the second end face by means of a third type of connection, wherein the first, second and third types of connection differ from one another.

The different types of connection make improved manufacture possible. Alternating the position of the types of connection on different end faces makes it possible to efficiently form a winding around the stator teeth lying between the slots.

Even types of connection on the same end face of the stator may differ by virtue of a pin foot being bent in different directions in relation to the stator interior or exterior.

A combination of the above-mentioned types of connection on different or the same end faces of the stator is also possible. The same type of connection on the same end faces and different types of connection on different end faces of the stator makes easy and quick manufacture possible. For example, on one end face the connection is produced by virtue of a type of pre-bent pins, what are referred to as double pins or else U-pins, and on another end face of the stator single pins or respective sides of the double pin are welded to one another. The weld points may lie at feet of the pins or double pins.

In one embodiment of the invention, the stator may comprise at least two windings and at least the fourth pin in the second slot may be connected to a fifth pin in the 4n–1 layer in a third slot by means of a fourth type of connection.

It is furthermore preferably possible for the stator to comprise a multiplicity of windings, which extend over the entire circumference of the stator and thereby form a part-coil.

This means that the windings have a symmetry which creates a uniform revolving field.

In a further embodiment, respective pins of two part-coils may be connected to one another by means of a fifth type of connection.

These pins may be what are referred to as end pins, since they mark the end of a part-coil. It is preferably possible for a second and a third end pin to be connected to one another by a fifth type of connection.

The fifth type of connection may be realized for example by a specially bent pin.

It is preferably possible for at least two part-coils to form a coil. It is possible for the coils to be interconnected within one quarter of all of the slots of the stator, that is to say within one quarter of the stator circumference.

It is furthermore preferably possible for respective inputs of a pin of two coils to be connected to one another by means of a sixth type of connection.

The sixth type of connection may be produced by a conductor attached to the pins or by a conductive ring.

The two coils may be connected in parallel and may additionally be fed by the same phase. The parallel connection may be effected by connecting a first and a fifth or a fourth and an eighth end pin in pairs.

The two coils may be connected in parallel and may additionally be fed by the same phase.

In a preferred embodiment of the invention, the part-coils may form six coils and six phases may be assigned to them in such a way that two coils, which are assigned to different phases, are respectively located in adjacent slots.

It is furthermore possible for two phases to respectively have an approximately identical current and voltage profile, and as a result for a six-phase inverter to control only a three-phase motor. This arrangement makes a current division of the switching elements in the inverter possible.

It is preferably possible for respective outputs of a pin of the two coils to be connected to one another and for the two coils as a result to be connected in parallel, and in particular assigned to one phase.

Two coils of adjacent slots may thus be connected in parallel and fed by one phase, resulting in a stator having windings for a three-phase electric machine.

It is furthermore preferably possible for the second type of connection to comprise a first double pin, which is formed from the second pin and the third pin, wherein the first double pin has two inwardly bent pin feet with a respective weld point and bridges a first radial distance.

The double pin may be inserted into the stator from one end face and be welded to a further double pin on the other end race.

In one embodiment of the invention, the fourth type of connection may comprise a second double pin, which is formed from the fourth pin and the fifth pin, wherein the second double pin has two outwardly bent pin feet with a respective weld point and bridges a first radial distance.

It is preferably possible for the fifth type of connection to comprise a third double pin, which is formed from a second end pin and a third end pin, wherein the third double pin has two outwardly bent pin feet with a respective weld point and bridges a second radial distance.

The first distance describes a number of slots to be bridged. The actual spatial distance to be bridged depends on the position of the pins in the layer, because the double pins connect different layers.

The second radial distance may be at least one slot shorter than the first radial distance.

It is furthermore preferably possible for a seventh type of connection to comprise a fourth double pin, which is formed from a sixth end pin and a seventh end pin, wherein the fourth double pin has two inwardly bent pin feet with a respective weld point and bridges a second radial distance.

In one embodiment of the invention, a single pin may comprise a fourth end pin or a fifth end pin, and have a pin foot which is bent clockwise and has a weld point.

In a further embodiment, a single pin may comprise a first end pin or an eighth end pin, and have a pin foot which is bent anticlockwise and has a weld point.

It is preferably possible for the first type of connection to be formed by a welded connection between a first weld point at the pin foot of the second double pin or of the first single pin or of the third double pin and a second weld point at the pin foot of the first double pin or of the fourth double pin or of the fourth single pin.

In a further embodiment of the invention, the third type of connection may be formed by a welded connection between a third weld point at the pin foot of the second double pin or of the third double pin or of the second single pin and a second weld point at the pin foot of the second double pin or of the fourth double pin or of the third single pin.

According to the invention, a vehicle comprises an electric machine with a stator according to one of the preferred embodiments.

DESCRIPTION OF THE FIGURES

FIG. 1 shows a stator 1 having a multiplicity of slots 5 in which pins 3 are guided. The stator has a first end face 7 and a second end face 9. On the first end face 7, inputs 81, 87, 101, 107, 111, 117 and outputs 83, 85, 103, 105, 113, 115 of part-coils for connecting the pin to an energy source for the operation of the electric machine are shown. Of course, a rotor is also necessary for the operation of an electric machine. For connection purposes, the pins lie close to one another and make short connection lines possible.

FIG. 2 shows a stator having slots 51, 52, 53, 54, 55, 56, 57, 58 and pins 21, 22, 23, 24 on four layers, only eight slots being illustrated. Pins are arranged in the slots. The pins lie next to one another in a slot; in the example of FIG. 2, four pins lie next to one another in a slot. The four pins within one slot therefore lie on different concentric circles around the center point M of the stator, which circles thus form individual layers L1, L2, L3, L4. There is a first distance 71 between two respective slots. This first distance 71 is identical between all of the slots shown in FIG. 2.

FIG. 3 shows the stator 1 from FIG. 2. The pins are still arranged on concentric circles, that is to say layers, the concentric circles not being depicted for the sake of better illustration. FIG. 3 illustrates which pins are connected to one another in series. A first pin 21 is located in a first slot 51 in the layer L3. This first pin 51 is connected to a second pin 22 in the slot 52 by means of a first type of connection 61, illustrated as a dotted line. The second pin 22 is located in the layer L4. The second pin 22 is connected to a third pin 23 in the slot 51 by means of a second type of connection 62, illustrated as a short-dashed line. The third pin 23 is located in turn in the first slot 51, that is to say in the same slot as the first pin 21. The third pin 23, however, lies in the layer L2 directly next to the first pin 21. Consequently, there is still space for two further pins in layers L1 and L4 next to the two pins 21, 23 in the slot 51. The third pin 23 is connected to a fourth pin 24 via a third type of connection 63, illustrated as a solid line. The fourth pin 24 lies in the same slot 52 as the second pin 22. The fourth pin 21 lies in the layer L1. Consequently, there is still space in the slot 52 for two further pins between the fourth pin 24 and the second pin 22. The connection of the first, second, third and fourth pins forms a first winding 41.

Figure 1:
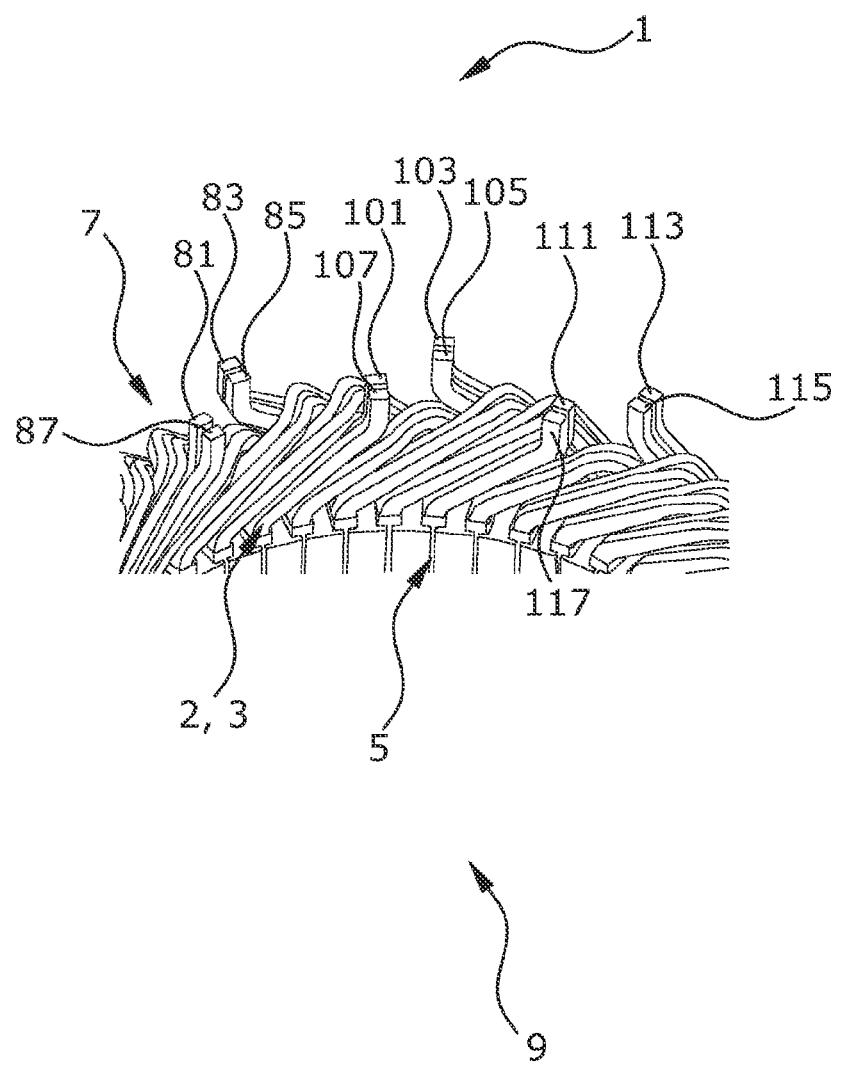
FIG. 1 shows a stator.
Figure 2:
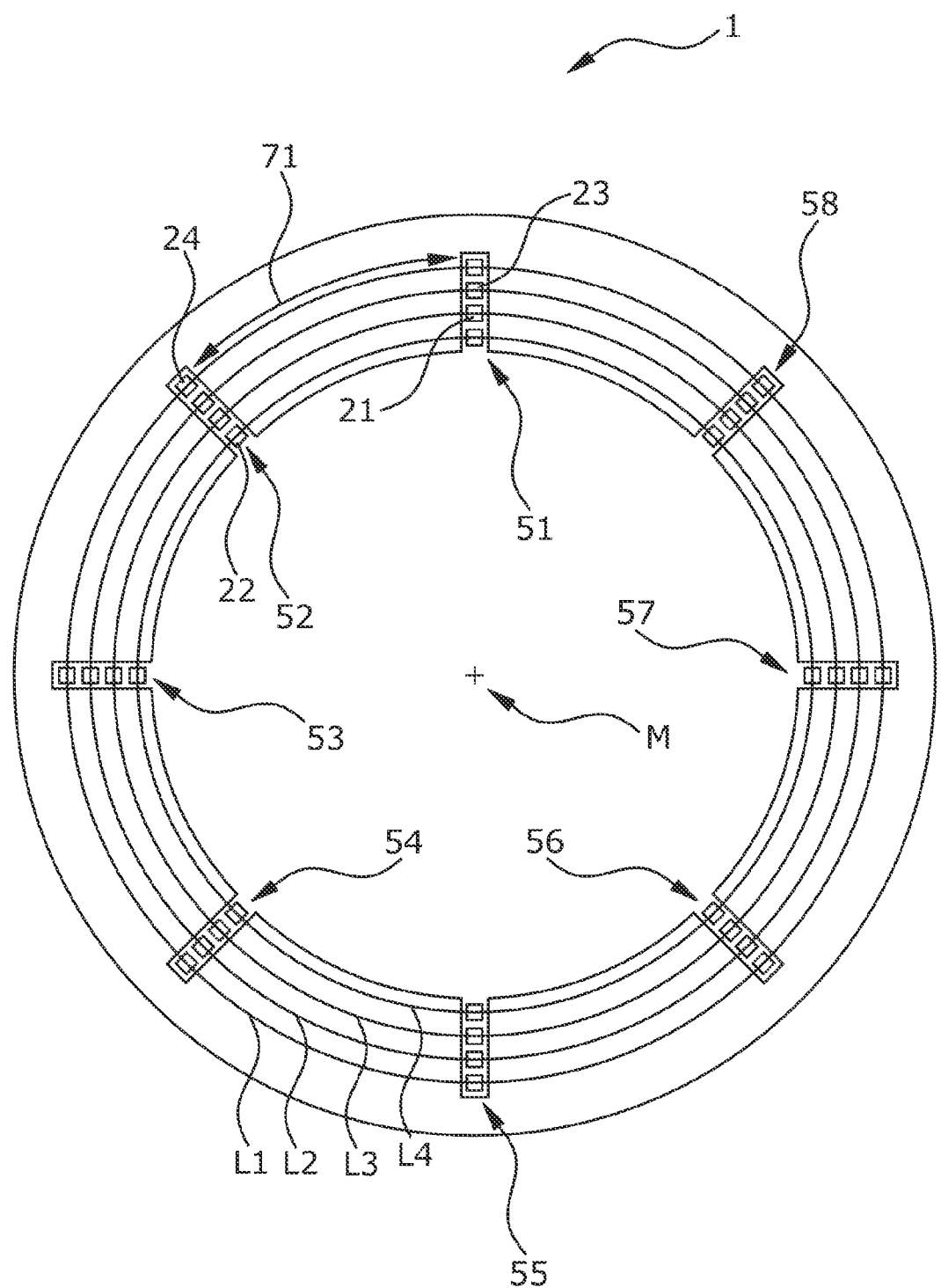
FIG. 2 shows a stator having eight slots and four layers.

The fourth pin 24 is connected to a fifth pin 25 in the layer L3 in a third slot 53 via a fourth type of connection 64, illustrated as a dashed line. With the fifth pin 25, the above described serial connection of the subsequent pins in the stator begins again, with the fifth pin 25 being similar to the first pin 21 but with the slot being offset by 90 degrees. The first pin 21, however, is a first end pin 21 and has an input, see FIG. 11.

The serial connection of the fifth pin 25 to further pins in the slots 53 and 54 forms a second winding 42. The first, second and third types of connection 61, 62, 63 between these pins are identical to the respective first, second and third types of connection 61, 62, 63 of the pins of the first winding 41.

The two windings 41, 42 are connected by the fourth type of connection 61. The continuation of the serial connection forms the third winding 43 in the slots 55, 56 and the fourth winding 44 in the slots 57, 58. The windings 42, 43, 44 are respectively connected by means of the fourth type of connection 64. The fourth type of connection 64 between the respective windings is therefore identical. It is also the case that the first, second and third types of connection 61, 62, 63 between the pins of the windings 43, 44 are identical to the first, second and third types of connection 61, 62, 63 of the first and second windings 41, 42.

The four windings 41, 42, 43, 41 form a first part-coil by way of a clockwise circuit around the stator 1. The last pin of the part-coil is in turn a second end pin 26. The slots are at an identical first distance 71 from one another.

Figure 3:
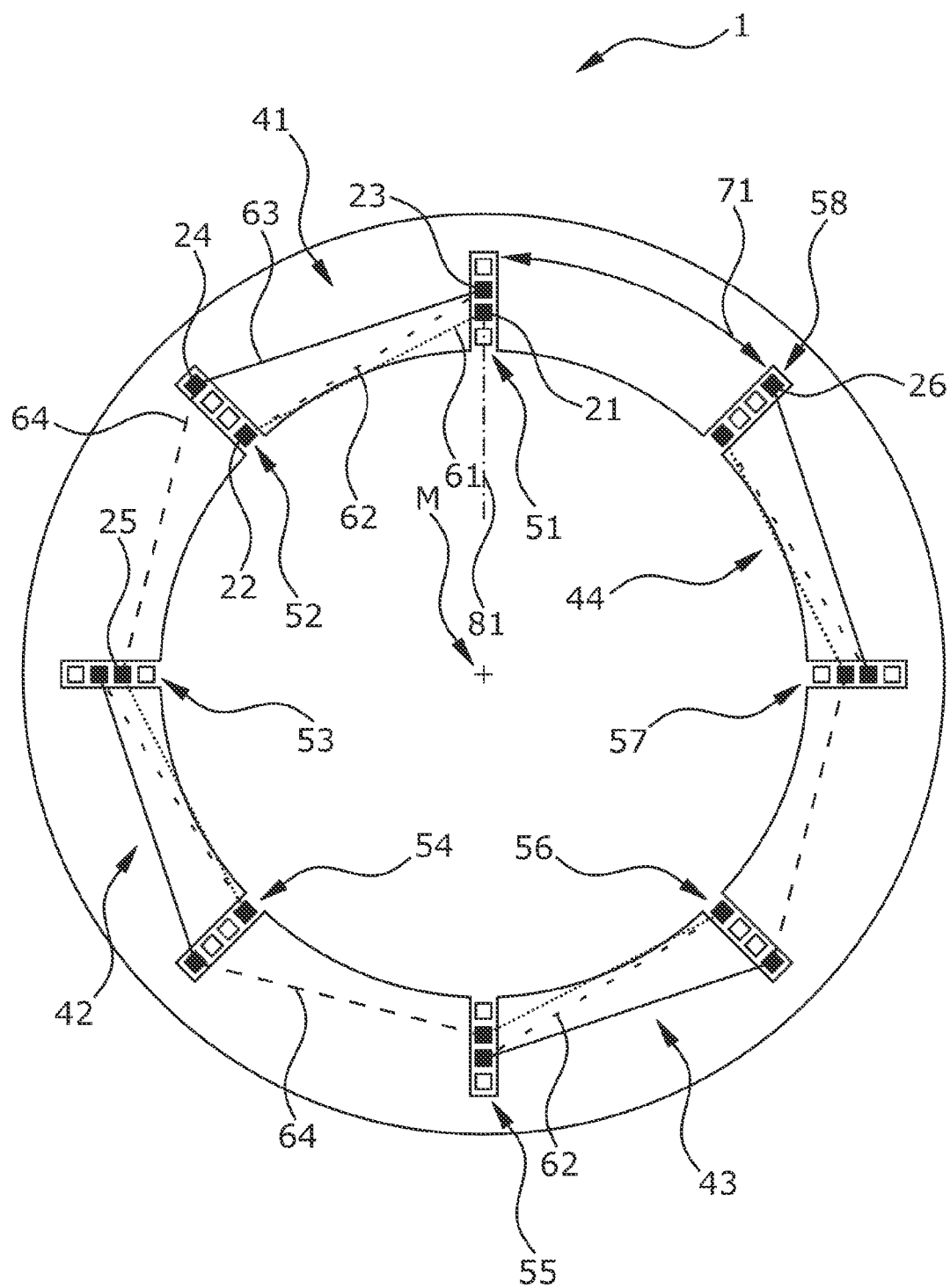
FIG. 3 shows a winding pattern of a first part-coil.
Figure 4:
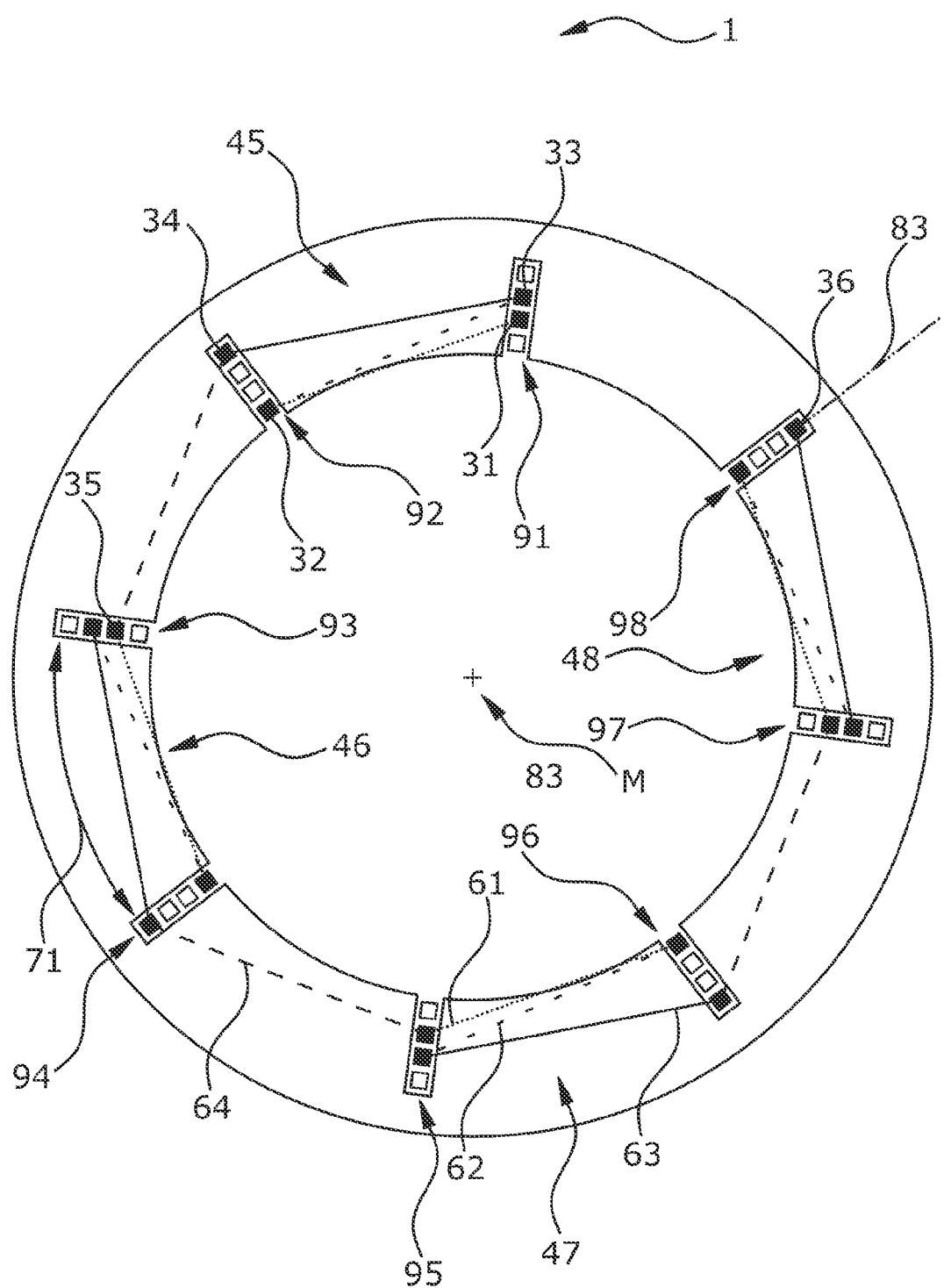
FIG. 4 shows a winding pattern of a second part-coil.

FIG. 4 shows the stator 1 from FIG. 3 and shows eight slots 91, 92, 93, 94, 95, 96, 97, 98, which are located in the direct vicinity of the slots of FIG. 3.

The pins 31, 32, 33, 34, 35 are connected in the same way as the pins 21, 22, 23, 24, 25 of FIG. 3. Even the type of connection is identical to FIG. 3 and is made clear by the same reference signs. In the same way as described for FIG. 3, the windings 45, 46, 47 and 48 are formed and connected to one another clockwise by the fourth type of connection 64. The first pin 31 is in turn a third end pin 31.

The fourth pin in the slot 98 on the layer L1 of the winding 43 is a fourth end pin 36 and has an output 83 for the connection of an energy source. The four windings 45, 46, 47, 48 form a second part-coil.

Figure 5:
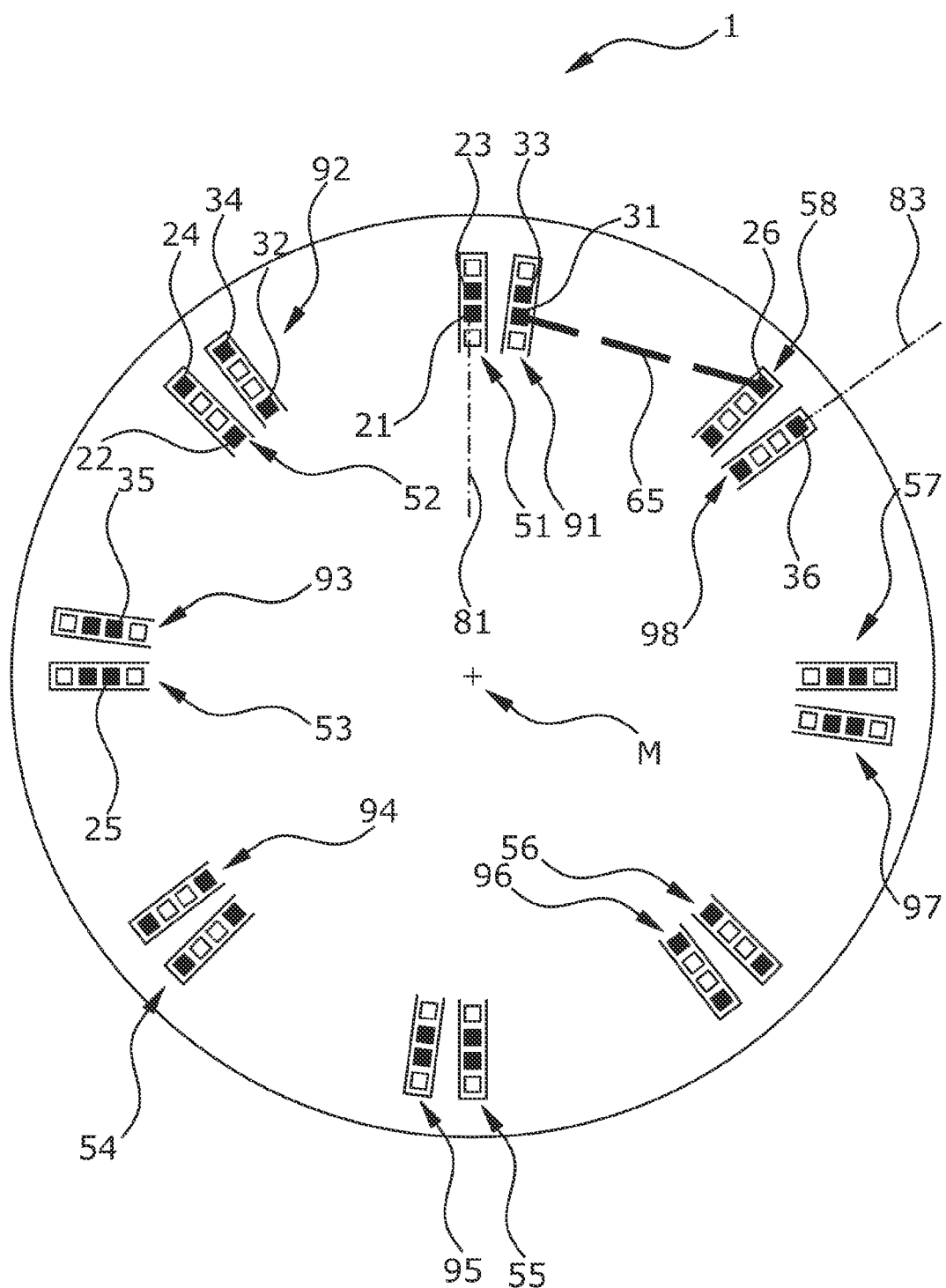
FIG. 5 shows a stator having two part-coils and the connection of said part-coils to one another, and thus a coil.

FIG. 5 shows a pin configuration through the first and the second part-coil from FIGS. 3 and 4, which are illustrated by black squares. The same reference signs denote the same pins, slots and connections in the figures. The fourth pin of the winding 48 of the first part-coil in slot 58, layer L1, and the first pin of the first winding 45 in slot 91, layer L3 are connected by means of a fifth type of connection 65. The two part-coils thus form a first coil with an input 81 and an output 83 after two radial circuits around the stator. It is therefore possible to see the end pins 21, 26, 36, 31 which respectively mark the beginning and the end of a part-coil.

Figure 6:
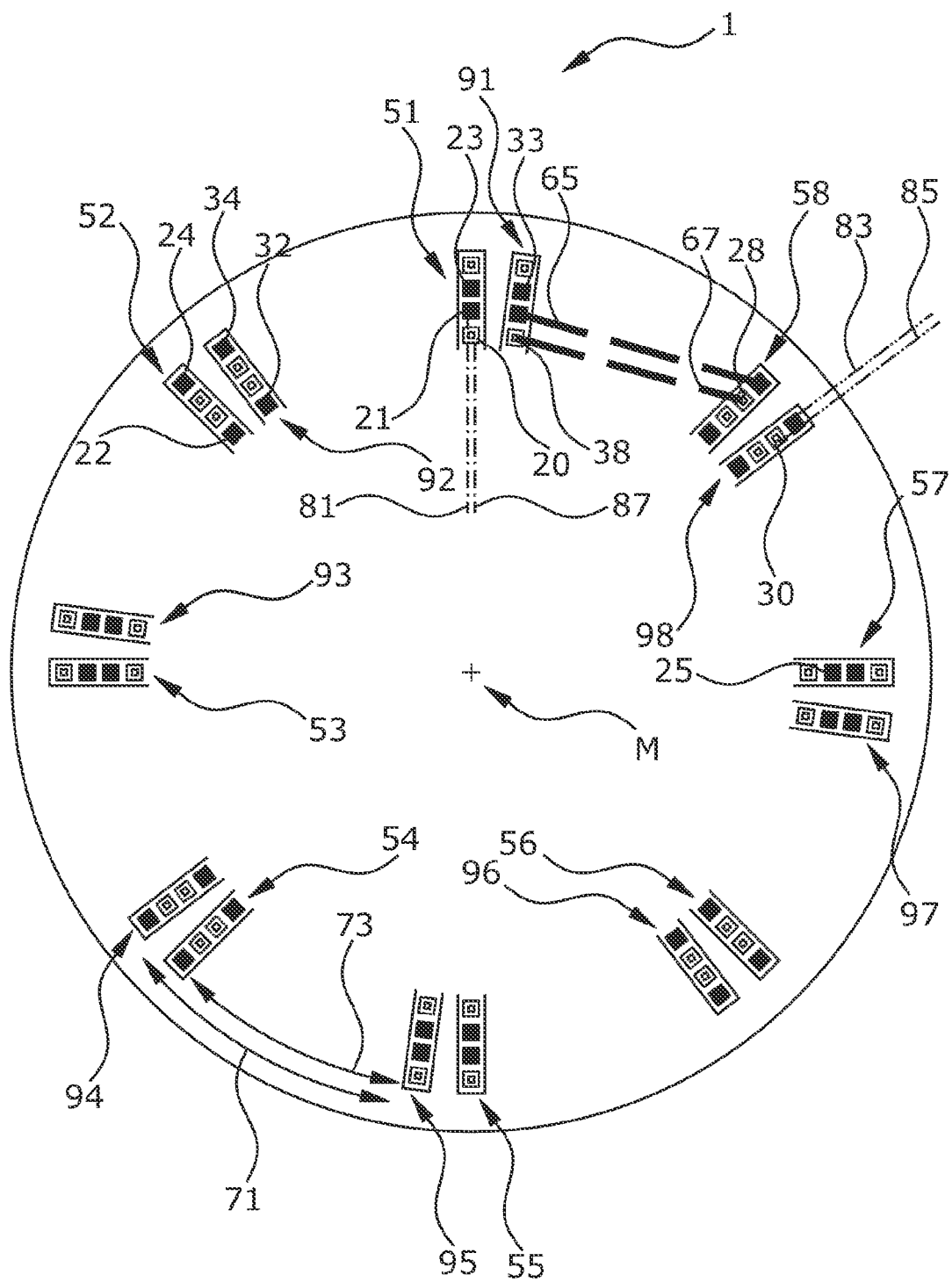
FIG. 6 shows a stator having two coils, consisting of two respective part-coils.

FIG. 6 shows a pin configuration through the first and the second part-coil from FIGS. 3 and 1, which are illustrated by black squares. The same reference signs denote the same pins, slots and connections in the figures. Furthermore, two further part-coils according to the principle of FIGS. 3 and 4 are indicated as black squares on a white background, but they are respectively offset by 5 slots in comparison with the first coil and respectively form a second and a third part-coil. It is also the case that these two part-coils are connected by means of the fifth type of connection 65 between a pin in slot 58, layer L2, and a pin in slot 91, layer L4, and form a second coil. The second coil is connected in the opposite direction to the first coil.

FIG. 6 thus shows two parallel coils, each of which consists of two part-coils. The inputs and outputs of the coils are likewise shown. The input 31 of the first coil is located at the slot 51 and the output 83 at the slot 98. The input 87 of the second coil is likewise located at the slot 51 and the output 85 at the slot 98. The inputs and outputs of she two coils are thus in the same respective slot. The second radial distance 73 is for example one slot shorter than the first radial distance 71.

Figure 7:
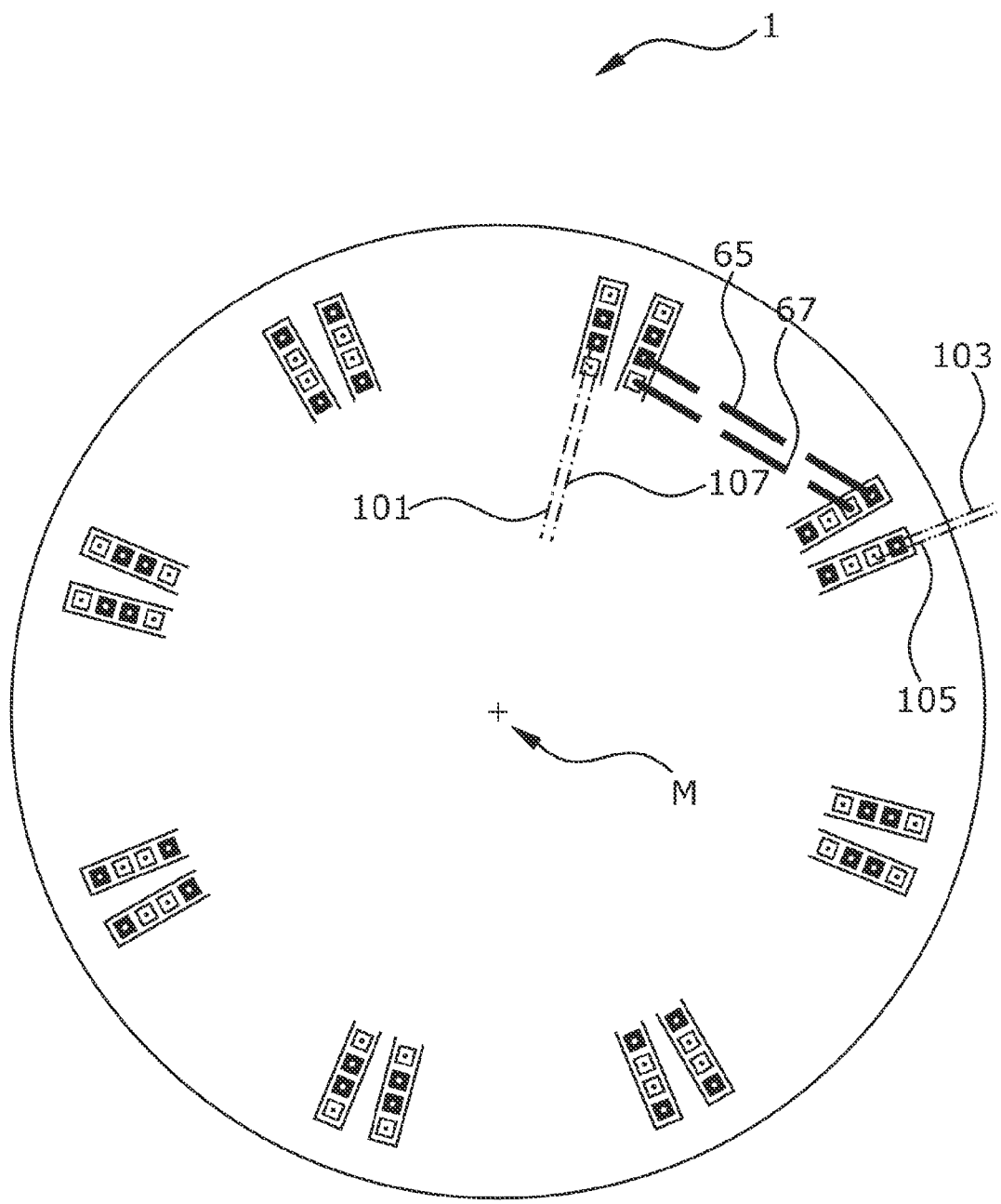
FIG. 7 shows a stator having two further coils.

FIG. 7 shows a pin configuration through a third and a fourth coil in the black squares with a white dot and the white squares with a black dot. This is produced by a winding pattern established in FIGS. 3, 4 and 5, which is offset clockwise by two slots in comparison with the pins and connections illustrated in the latter figures. The inputs 101 and outputs 103 of the third coil and inputs 107 and outputs 105 of the fourth coil are likewise shown. The inputs and outputs of the two coils are thus in the same respective slot.

Figure 8:
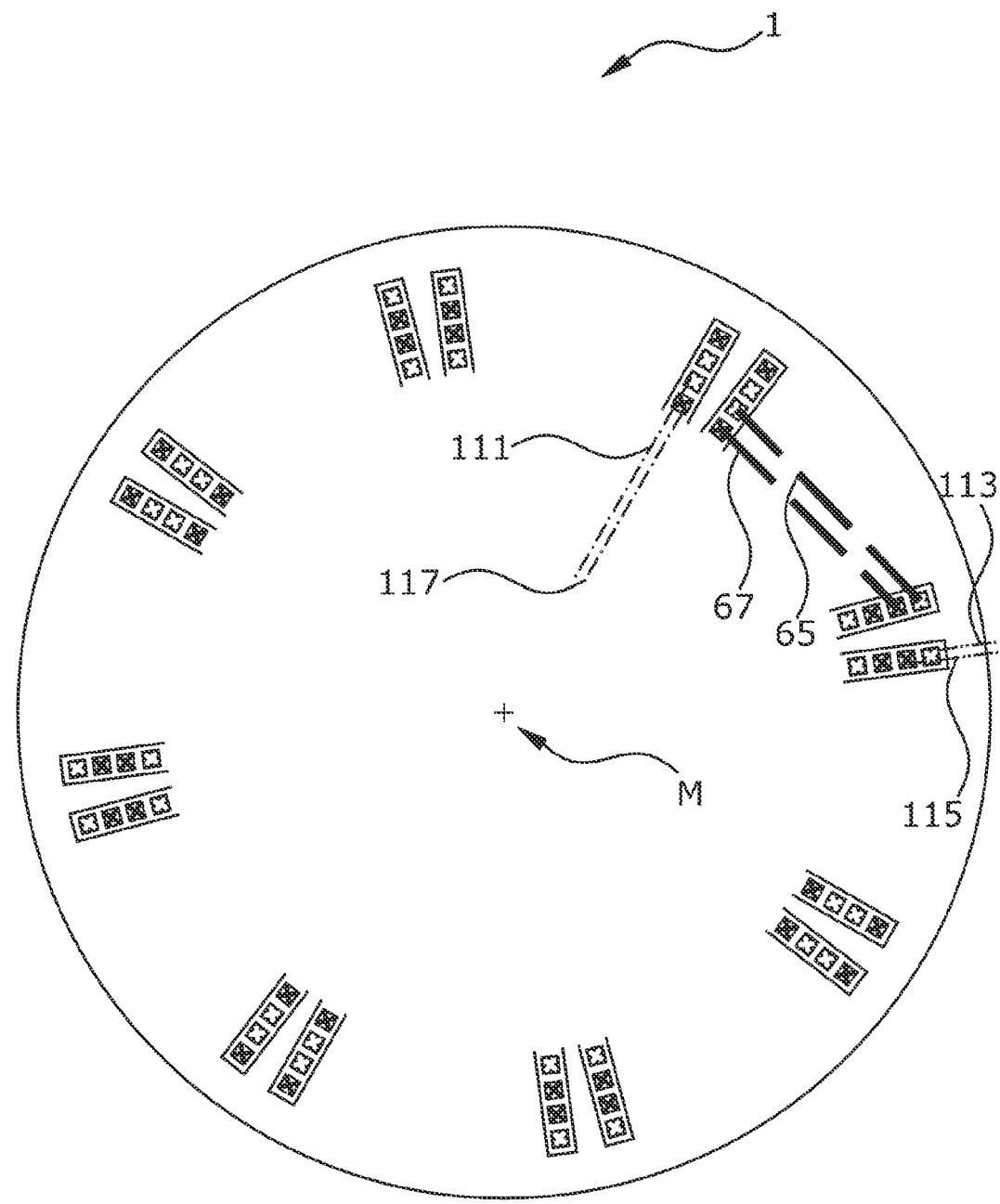
FIG. 8 shows a stator having two further coils.

FIG. 8 shows a pin configuration through a fifth and a sixth coil. This is produced by a winding pattern established in FIGS. 3, 4 and 5, which is offset clockwise by four slots in comparison with the pins and connections illustrated in the latter figures.

The inputs 111 and outputs 113 of the fifth coil and inputs 117 and outputs 115 of the sixth coil are likewise shown. The inputs and outputs of the two coils are thus in the same respective slot.

Figure 9:
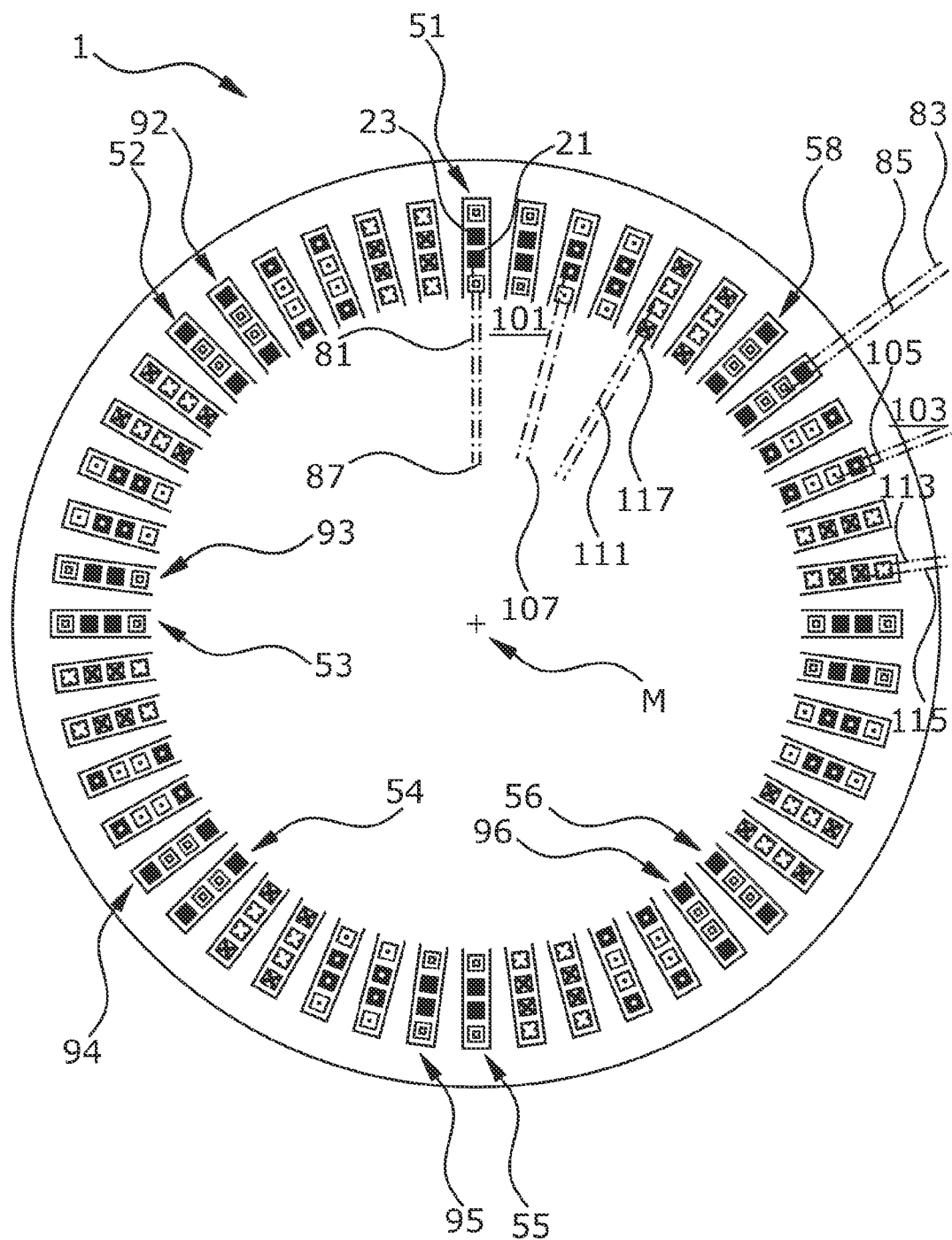
FIG. 9 shows a stator having six coils.

FIG. 9 shows a pin configuration through the six coils in the form of a combination of FIGS. 6, 7 and 8. It is clear in particular from the position of the inputs 81, 87, 101, 107, 111, 117 and outputs 83, 85, 103, 105, 113, 115 that the coils can be interconnected within 12 slots. In the case of the 48-slot stator illustrated, it is thus possible to interconnect the inputs and outputs within one quarter of the stator circumference.

Figure 10:
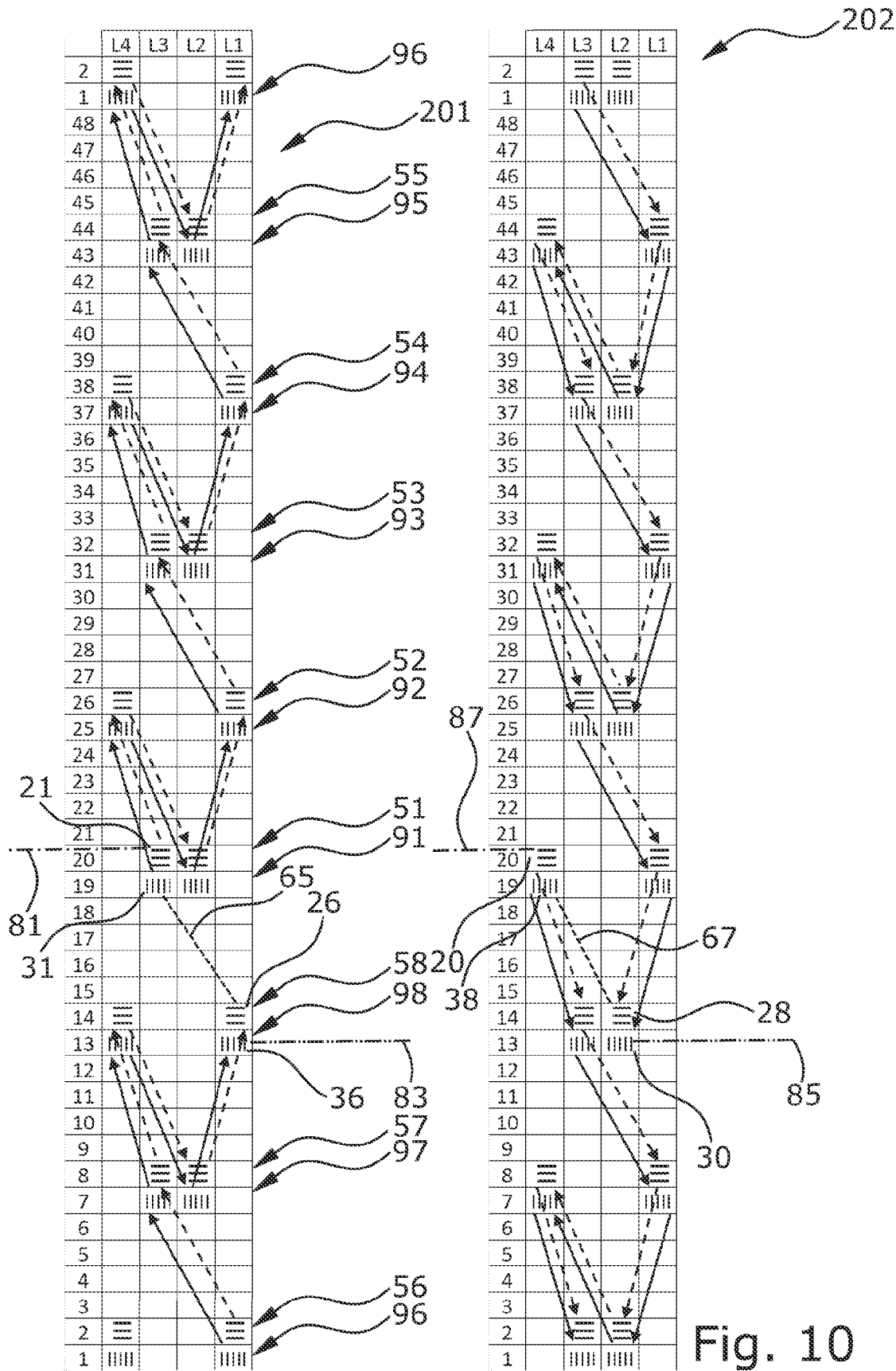
FIG. 10 shows a winding pattern of two coils.

FIG. 10 shows two coils 201, 202, each of which consists of two part-coils. The same reference signs establish the relationship with the other figures. The connection of the part-coils to the coil and the connection of the respective coil to an inverter, for example, can be seen in FIG. 10. Pin 21 of the first coil 201 constitutes a first end pin 21 and has an input 81. A serial connection of the pins, shown as horizontal dashes, by means of the dashed-line arrows almost completes a single radial circuit around the stator and forms the first circuit, which comprises the first part-coil. The first end pin 21 is at the beginning of the first part-coil and the second end pin 26 is at the end.

Figure 15:
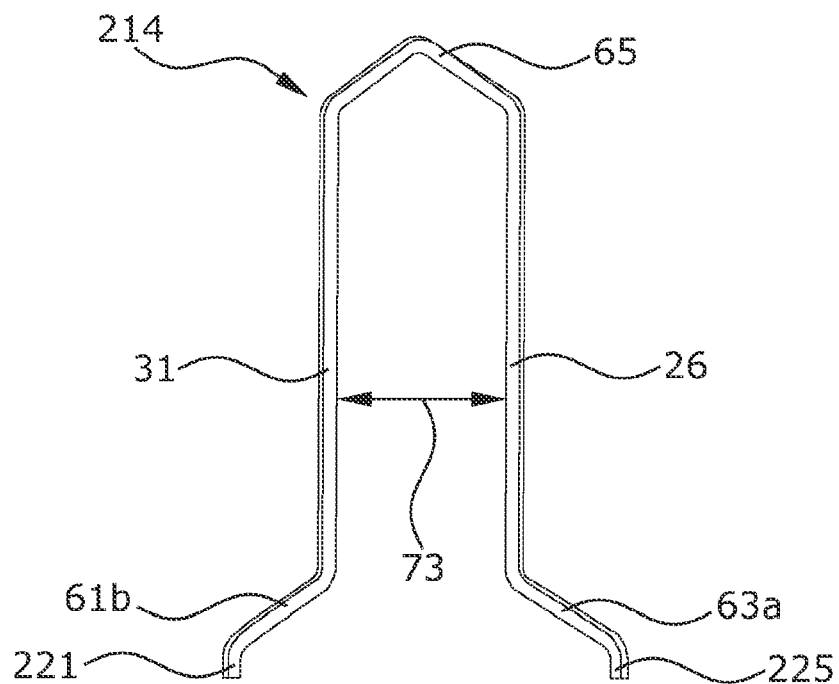
FIG. 15 shows a double pin with outwardly bent pin feet and a slot width which is smaller by one slot than the double pin from FIG. 11.

The second part coil is formed by connecting the pins, shown as horizontal dashes, by means of the solid-line arrows. The part-coil begins with the third end pin 31 and ends with the fourth end pin 36. The fourth end pin is connected to an inverter, for example, by way of the output 83. The fifth type of connection 65 is located between the second end pin 26 of the first part-coil and the third end pin 31 of the second part coil. The two end pins 31, 26 and the fifth type oil connection 65 are shown in FIG. 15. Both circuits of the first coil 201 take place in a first direction, for example anticlockwise.

Pin 20 of the second coil 202 constitutes a fifth end pin 20 and has an input 87. A serial connection of the pins, shown as horizontal dashes, by means of the dashed-line arrows almost completes a single radial circuit around the stator and forms the first circuit, which comprises the first part-coil. The fifth end pin 21 is at the beginning of the second part-coil and the sixth end pin 28 is at the end.

Figure 16:
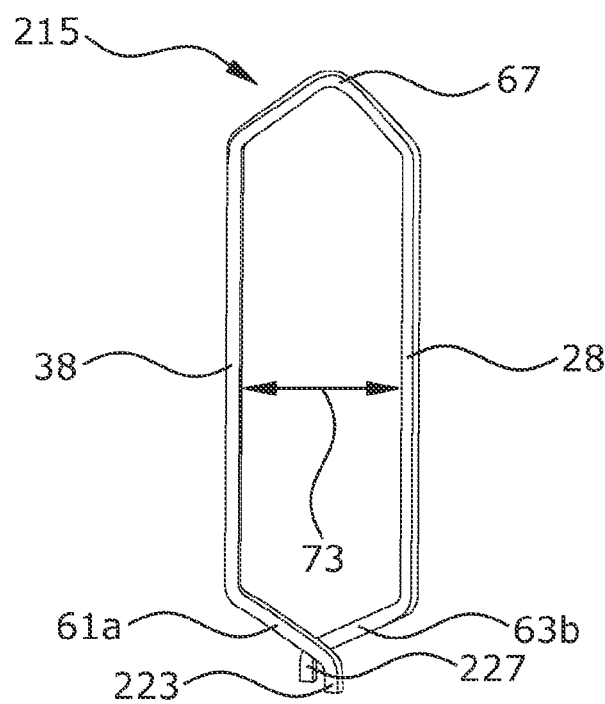
FIG. 16 shows a double pin with inwardly bent pin feet and a slot width which is smaller by one slot than the double pin from FIG. 13.
Figure 17:
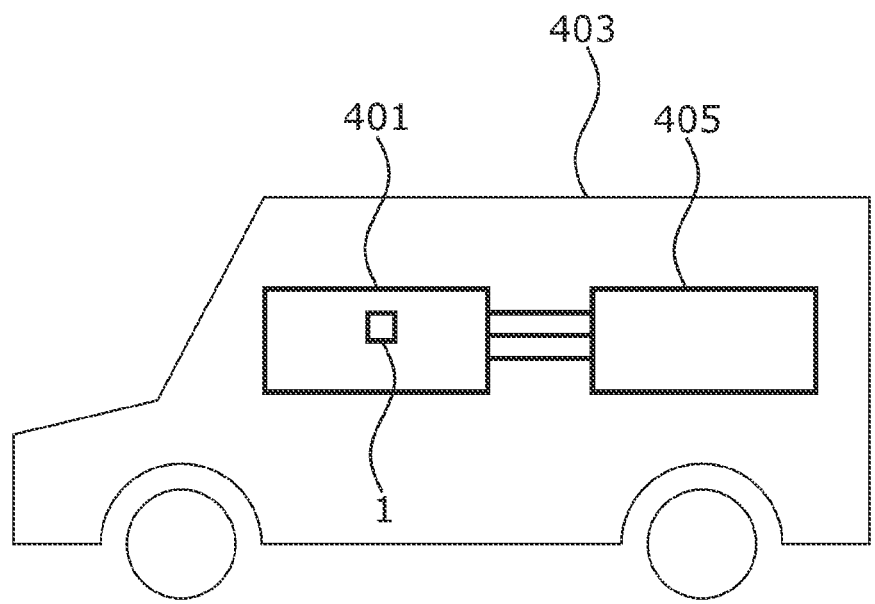
FIG. 17 shows a vehicle having an electric machine, in particular an electric motor, having a stator with an interface.

The second part-coil is formed by connecting the pins, shown as horizontal dashes, by means of the solid-line arrows. The part-coil begins with the seventh end pin 38 and ends with the eighth end pin 30. The eighth end pin 30 is connected to an inverter, for example, by way of the output 85. The seventh type of connection 67 is located between the sixth end pin 28 of the first part-coil and the seventh end pin 38 of the second part-coil. The two end pins 28, 33 and the seventh type of connection 67 are shown in FIG. 16.

Both circuits of the second coil 201 take place in a second direction, for example anticlockwise. The circulation directions of the two coils may be selected freely, but they must be opposite directions.

Figure 11:
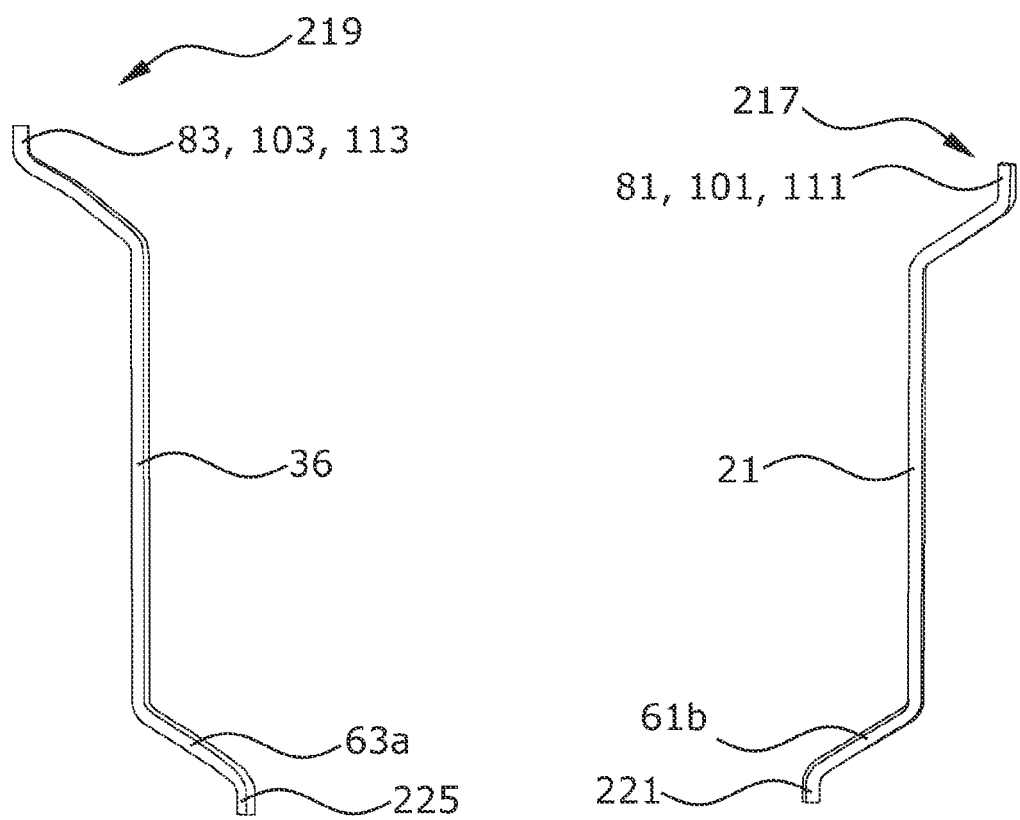
FIG. 11 shows two single pins of the first coil.

FIG. 11 shows two single pins 217, 219 or I-pins. The actual pin 36, 31 which is arranged in the slot of the stator is located in the center. The reference signs are identical to the preceding figures. The pins are illustrated with the first end face 7 upward from the perspective of the stator center point. The input 81, 101, 111 or output 83, 103, 113 is located at the top end.

The left-hand single pin 219 is used on layer 1 for the fourth end pin 36. At the bottom end, the end pin has a pin foot 63a with a weld point 225. The output 83, 103, 113 is located at the top end.

The right-hand single pin 217 is used on layer 3 for the first end pin 21 or first pin 21. At the bottom end, the end pin has a pin foot 61a with a weld point 221. The input 81, 101, 111 is located at the top end.

Figure 12:
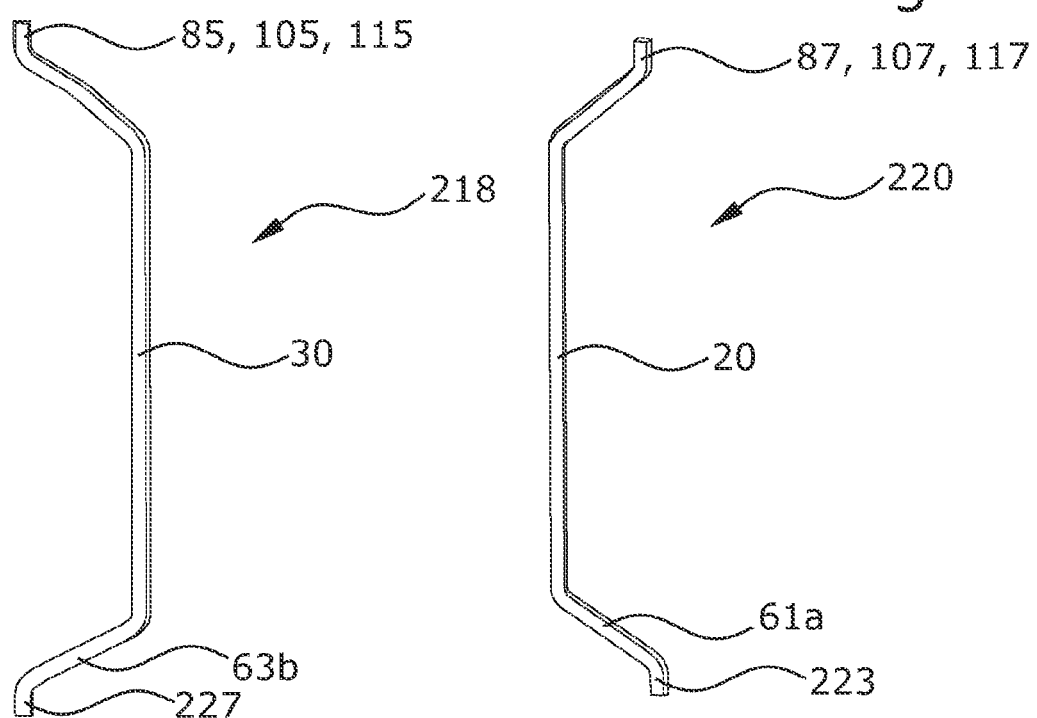
FIG. 12 shows two single pins of the second coil.

FIG. 12 shows two single pins 218, 220 or I-pins. The actual pin 30, 20 which is arranged in the slot of the stator is located in the center. The reference signs are identical to the preceding figures. The pins are illustrated with the first end face 7 upward from the perspective of the stator center point.

The left-hand single pin 218 is used on layer 2 for the eighth end pin 30. At the bottom end, the end pin has a pin foot 63b with a weld point 227. The output 85, 105, 115 is located at the top end.

The right-hand single pin 220 is used on layer 4 for the fifth end pin 20. At the bottom end, the end pin has a pin foot 61a with a weld point 223. The output 87, 107, 117 is located at the top end.

Figure 13:
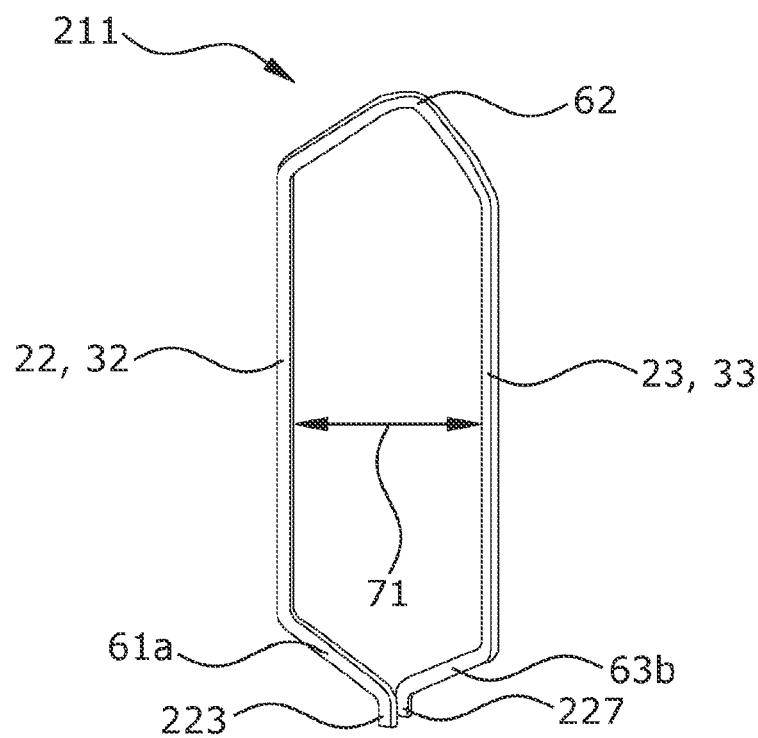
FIG. 13 shows a double pin with inwardly bent pin feet.

FIG. 13 shows a first double pin 211 or U-pin, which establishes the type of connection 62 between a second pin 22, 32 and a third pin 23, 33. The double pin may bridge the first distance 71 between the slots. At the bottom end, the double pin has two inwardly bent pin feet 61a, 63b with a weld point 223, 227.

Figure 14:
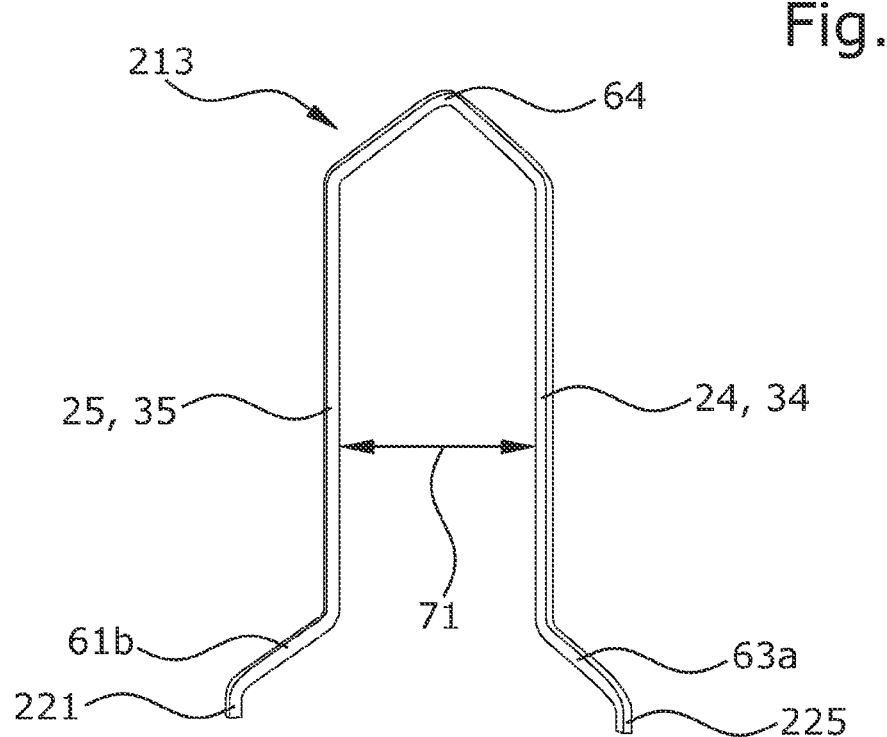
FIG. 14 shows a double pin with outwardly bent pin feet.

FIG. 14 shows a second double pan 213 or U-pin, which establishes the type of connection 64 between a fourth pin 24, 34 and a fifth pin 25, 35. The double pin may bridge the first distance 71 between the slots. At the bottom end, the double pin has two outwardly bent pin feet 61b, 63a with a weld point 221, 225.

The first distance 71 is identical only with respect to the number of slots to be bridged. The actual spatial distance to be bridged is different, because the double pins connect different layers.

FIG. 15 shows a third double pin 214 or U-pin, which establishes the type of connection 65 between a second end pin 26 and a third end pin 31. The double pin may thus bridge the distance 73 by one slot less than the first distance 71. At the bottom end, the double pin has two outwardly bent pin feet 61b, 63a with a weld point 221, 225.

FIG. 16 shows a fourth double pin 215 or U-pin, which establishes the type of connection 67 between a sixth end pin 28 and a seventh end pin 38. The double pin may thus bridge the distance 73 by one slot less than the first distance 71. At the bottom end, the double pin has two inwardly bent pin feet 61a, 63b with a weld point 223, 227.

The various single and double pins in FIGS. 11 to 16 have similar pin feet. The connection 61 is formed by welding together the weld points 221, 223 at the pin feet 61a, 61b according to the winding pattern of FIG. 10. The connection 63 is formed by welding together the weld points 225, 227 at the pin feet 63a, 63b according to the winding pattern of FIG. 10.

FIG. 16 is a basic diagram of an exemplary embodiment of a vehicle 403, for example a hybrid vehicle or an electric vehicle, comprising an electric machine 401, in particular an electric motor, with an exemplary embodiment of the stator 1 for driving the vehicle 403. The vehicle 403 may also comprise an inverter 405, which supplies the electric machine 401 with an alternating current from a direct-current source.

LIST OF REFERENCE SIGNS

1 Stator
2, 21, 22, 23, 24, 25 Pin
31, 32, 33, 34, 35 Pin
5, 51, 52, 53, 54, 55, 56, Slot
57, 53, 91, 92, 93, 94, 95, Slot
96, 97, 98 Slot
7 First end face
9 Second end face
20, 21, 26, 28, 30, 31, 36, 38 End pins
41-48 Winding
61 First type of connection
62 Second type of connection
63 Third type of connection
64 Fourth type of connection
65 Fifth type of connection
66 Sixth type of connection
67 Seventh type of connection
61a, 61b, 63a, 63b Pin foot
71 First radial distance
73 Second radial distance
401 Electric machine
81, 87, 101, 107, 111, 117 Input
83, 85, 103, 105, 113, 115 Output
201 First coil
202 Second coil
211, 213, 214, 215 Double pin
217, 213, 219, 220 Single pin
221, 223, 225, 227 Weld point
403 Vehicle
405 Inverter
L1, L2, L3, 54 Layer
M Stator center point

The invention claimed is:

1. A stator for an electric machine, comprising:
a plurality of pins arranged on concentric circles at different distances from a stator center point in slots wherein each concentric circle forms a layer,
wherein four pins in different layers are respectively connected to one another in series and form a winding,
a first pin of the winding is located in a first slot in a 4n−1 layer, wherein n is a natural number,
a second pin of the winding is located in a second slot in a 4n layer, wherein the second slot is at a first radial distance from the first slot in a first circumferential direction of the stator,
a third pin of the winding is located in the first slot in a 4n−2 layer, and
a fourth pin of the winding is located in the second slot in a 4n−3 layer.

2. The stator according to claim 1, further comprising:
a first end face and a second end face,
wherein the first pin and the second pin are connected to one another on the second end face by means of a first type of connection,
the second pin and the third pin are connected to one another on the first end face by means of a second type of connection,
the third pin and the fourth pin are connected to one another on the second end face by means of a third type of connection, wherein the first, second and third types of connection differ from one another.

3. The stator according to claim 2,
wherein the first type of connection is formed by a welded connection between a first weld point at a first pin foot and a second weld point at a second pin foot,
wherein the first pin foot is a pin foot of a second double pin or a pin foot of a first single pin, or a pin foot of a third double pin, and
wherein the second pin foot is a pin foot of a first double pin or a pin foot of a fourth double pin, or a pin foot of a fourth single pin.

4. The stator according to claim 2,
wherein the third type of connection is formed by a welded connection between a third weld point at a third pin foot and a fourth weld point at a fourth pin foot,
wherein the third pin foot is a pin foot of a second double pin or a pin foot of a third double pin, or a pin foot of a second single pin, and
wherein the fourth pin foot is a pin foot of a first double pin or a pin foot of a fourth double pin, or a pin foot of a third single pin.

5. The stator according to claim 1, wherein the stator has at least two windings and at least the fourth pin in the second slot is connected to a fifth pin in the 4n−1 layer in a third slot by means of a fourth type of connection.

6. The stator according to claim 5, further comprising: a plurality of windings, which extend over the entire circumference of the stator and thereby form a part-coil.

7. The stator according to claim 6, wherein respective pins of two part-coils are connected to one another by means of a fifth type of connection.

8. The stator according to claim 7, wherein at least two part-coils form a coil.

9. The stator according to claim 8, wherein the part-coils form six coils and six phases are assigned to them in such a way that two coils, which are assigned to different phases, are respectively located in adjacent slots.

10. The stator according to claim 8, wherein respective inputs of a pin of two coils are connected to one another by means of a sixth type of connection.

11. The stator according to claim 10, wherein respective outputs of a pin of the two coils are connected to one another and the two coils as a result are connected in parallel, and assigned to one phase.

12. The stator according to claim 1, wherein the second type of connection comprises a first double pin which is formed from the second pin and the third pin, wherein the first double pin has two inwardly bent pin feet with a respective weld point and bridges a first radial distance.

13. The stator according to claim 1, wherein the fourth type of connection comprises a second double pin, which is formed from the fourth pin and the fifth pin, wherein the second double pin has two outwardly bent pin feet with a respective weld point and bridges a first radial distance.

14. The stator according to claim 1, wherein the fifth type of connection comprises a third double pin, which is formed from a second end pin and a third end pin, wherein the third double pin has two outwardly bent pin feet with a respective weld point and bridges a second radial distance.

15. The stator according to claim 1, wherein a seventh type of connection comprises a fourth double pin, which is formed from a sixth end pin and a seventh end pin, wherein the fourth double pin has two inwardly bent pin feet with a respective weld point and bridges a second radial distance.

16. The stator according to claim 1, wherein a single pin comprises a fourth end pin or a fifth end pin and has a pin foot which is bent clockwise and has a weld point.

17. The stator according to claim 1, wherein a single pin comprises a first end pin or an eighth end pin and has a pin foot which is bent counterclockwise and has a weld point.

18. A vehicle having an electric machine with a stator according to claim 1.

* * * * *